United States Patent
Arase et al.

(10) Patent No.: US 10,080,377 B2
(45) Date of Patent: Sep. 25, 2018

(54) METHOD FOR MANUFACTURING DENATURED WHEY PROTEIN

(71) Applicant: MORINAGA MILK INDUSTRY CO., LTD., Tokyo (JP)

(72) Inventors: Hiroshi Arase, Zama (JP); Manabu Suzuki, Zama (JP)

(73) Assignee: MORINAGA MILK INDUSTRY CO., LTD., Tokyo (JP)

( * ) Notice: Subject to any disclaimer, the term of this patent is extended or adjusted under 35 U.S.C. 154(b) by 193 days.

(21) Appl. No.: 14/415,900

(22) PCT Filed: Sep. 27, 2013

(86) PCT No.: PCT/JP2013/076289
§ 371 (c)(1),
(2) Date: Jan. 20, 2015

(87) PCT Pub. No.: WO2014/051064
PCT Pub. Date: Apr. 3, 2014

(65) Prior Publication Data
US 2015/0181908 A1    Jul. 2, 2015

(30) Foreign Application Priority Data
Sep. 28, 2012    (JP) ................................. 2012-217751

(51) Int. Cl.
*A23J 3/08* (2006.01)
*A23L 1/06* (2006.01)
*A23C 21/00* (2006.01)
*A23C 1/00* (2006.01)

(52) U.S. Cl.
CPC ............... *A23J 3/08* (2013.01); *A23C 21/00* (2013.01); *A23C 1/00* (2013.01); *A23C 2210/00* (2013.01); *A23V 2002/00* (2013.01)

(58) Field of Classification Search
CPC ... A23J 3/08; A23C 21/00; A23C 1/00; A23L 1/06
USPC .................................................. 426/656, 657
See application file for complete search history.

(56) References Cited

U.S. PATENT DOCUMENTS

| | | | |
|---|---|---|---|
| 6,458,395 B1 * | 10/2002 | Emoto | A23L 33/40 426/573 |
| 6,511,695 B1 * | 1/2003 | Paquin | A23C 19/0904 426/519 |
| 6,605,311 B2 * | 8/2003 | Villagran | A23F 3/163 426/590 |
| 2002/0039617 A1 | 4/2002 | Villagran et al. | |
| 2006/0204643 A1 * | 9/2006 | Merrill | A23G 3/32 426/656 |
| 2010/0136166 A1 | 6/2010 | Ye et al. | |

FOREIGN PATENT DOCUMENTS

| | | |
|---|---|---|
| EP | 2250906 A1 | 11/2010 |
| JP | 7-507452 A | 8/1995 |
| JP | 2003-506102 A | 2/2003 |
| JP | 4637449 B2 | 12/2010 |
| JP | 2012-505640 A | 3/2012 |
| WO | WO 93/25086 A1 | 12/1993 |
| WO | WO 01/11977 A1 | 2/2001 |
| WO | WO 01/97629 A2 | 12/2001 |
| WO | WO 2010/043415 A2 | 4/2010 |

OTHER PUBLICATIONS

General encyclopedia of Milk, 1998, 60-61 and its translation of pertinent section.
General encyclopedia of Milk, 1998, 356-357 and its translation of pertinent section.
E. Venir et al., Dynamic high pressure-induced gelation in milk protein model systems, Journal of Dairy Science vol. 93 No. 2, 2010, 483-494.
International Search Report dated Dec. 10, 2013, issued to the corresponding International Application No. PCT/JP2013/076289.
Extended European Search Report for European Application No. 13841528.6, dated May 20, 2016.
Japanese Notice of Reason for Rejection for Japanese Application No. 2014-519337, dated Jun. 16, 2015, with an English translation thereof.
New Zealand Office Action for New Zealand Application No. 703211, dated Feb. 2, 2016.
New Zealand Office Action for New Zealand Application No. 703211, dated Jun. 30, 2015.

* cited by examiner

*Primary Examiner* — Bhaskar Mukhopadhyay
(74) *Attorney, Agent, or Firm* — Birch, Stewart, Kolasch & Birch, LLP (57) ABSTRACT

The present disclosure provides a method for manufacturing an excellent denatured whey protein having no adverse effect on the characteristics of a product. A method for manufacturing a denatured whey protein comprising processing a whey protein solution by repeating the following steps (1) and (2) 2 times or more continuously: (1) a step for treating the whey protein solution on pressure at 50 MPa or higher and on heating at 85 to 100° C.; and, (2) a step for decompressing to 0.05 to 0.5 MPa after the treating of the aforementioned step (1) and maintaining the temperature within the range of the heating temperature of the aforementioned step (1) ±10° C.

7 Claims, 3 Drawing Sheets

Comparative Product 1

[Fig. 4]

Example Product 1

METHOD FOR MANUFACTURING DENATURED WHEY PROTEIN

CROSS-REFERENCE TO RELATED APPLICATIONS

This application is a national stage of International Application No. PCT/JP2013/076289, filed Sep. 27, 2013, which claims the benefit of priority to Japanese Application No. 2012-217751, filed Sep. 28, 2012, in the Japanese Patent Office. All disclosures of the document(s) named above are incorporated herein by reference.

BACKGROUND OF THE INVENTION

1. Field of the Invention

The present disclosure relates to a method for manufacturing a denatured whey protein.

2. Description of the Related Art

A whey protein is a protein present in a milk and well known as a by-product occurring during the manufacture mainly of cheeses and casein, and the whey protein is also known to have a low heat stability and undergoes a rapid denaturation when heated at 70 to 90° C. (Non-Patent Document 1).

Recently, the whey protein has become to be used in various food products because it is a high quality protein component having a large amount of minerals. In addition to the food products, other products such as cosmetics including shampoos, rinses, and creams also employ the whey protein.

While the whey protein is utilized in a wide range of the application, it is used sometimes as being subjected to a heat sterilization, and the temperature for which is usually higher than the range where the whey protein is denatured. Since this heating at a temperature higher than the range where the whey protein is denatured allows the whey protein in a product to be denatured, the product undergoes an increase in the viscosity, gelation, aggregation, and the like. Such a state has an adverse effect on the characteristics of the product, and raises a necessity of limitation to the whey protein content of the product or substitution with another protein raw material.

In order to reduce the adverse effects of the heat sterilization on the products, a method for denaturing a whey protein preliminarily by means of a physical or chemical treatment before use was proposed previously.

Patent Document 1 discloses an invention relating to a composition of a substance containing 20% by mass or less of a soluble whey protein substance and 80% or more of a denatured whey protein particle having a protein insolubility.

CITATION LIST

Patent Literature

[Patent Document 1] Japanese Patent No. 4637449

Non Patent Literature

[Non-Patent Document 1] Ed. by K. Yamauchi, K. Yokoyama, "Milk Sogo Jiten", First edition, Third print, Asakura Publishing Co., Ltd., 1998, page 61

SUMMARY OF THE INVENTION

Technical Problem

Nevertheless, the denatured whey protein described in Patent Document 1 is combined, based on Examples 4 to 12 of Patent Document 1, with a dispersant, emulsifier, gelling agent, and the like and subjected to a heat treatment thereby preventing the adverse effects of the denatured whey protein on the product. This means that the effects of the dispersant, emulsifier, gelling agent, and the like serve to inhibit the adverse effects of the denatured whey protein on the characteristics of the product.

Actually the denatured protein obtained by the manufacturing method described in Patent Document 1 lacked the heat stability as shown in Comparative Example 1 described later in this specification. Accordingly, the denatured whey described in Patent Document 1 itself, which is not combined with the dispersant and the like, may have an adverse effect on the characteristics of the product such as flavor or appearance.

In the circumstance described above, it is actually desired to provide a further preferable denatured whey protein having no adverse effects on the characteristics of the product such as flavor or appearance.

Accordingly, the present disclosure is intended, in view of such a circumstance, to provide a method for manufacturing a denatured whey protein having an excellent heat stability which has no adverse effect on the characteristics of a product.

Solution to Problem

As a result of our intensive study, we obtained an excellent denatured whey protein which has no adverse effect on the characteristics of a product by subjecting a whey protein solution to a step for treating on pressure at certain pressure and on heating at certain temperature; and a step, after this treating, for conducting a treatment while releasing the pressure which are repeated 2 times or more continuously, thereby establishing the present invention. Moreover, the denatured whey protein thus obtained has a good heat stability, and a product employing this denatured whey protein has good appearance, flavor, and texture even after a heat treatment.

The phrase "having no adverse effect on the characteristics of a product" means that, even when subjecting a product containing the denatured whey protein to a heat treatment, the denatured whey protein has no adverse effect (for example an effect raised by gelation, aggregation, thickening, and the like) on the characteristics of a product (for example the appearance, flavor, and texture of the product).

Accordingly, a denatured whey protein is subjected, focusing its heat stability, to a heat stability test, and if it is judged to be "good", then it is judged to be "a denatured whey protein having no adverse effect on the characteristics of a product".

<Heat Stability Test>

A sample is prepared as a 10% by mass solution of the protein, and this solution is heated by an autoclave at 120° C. for 15 minutes, after which it is judged whether it exhibited any occurrence of a visible gelation/aggregation or it exhibited no such an occurrence while remaining as a solution. Further, one exhibited no such an occurrence is examined for the degree of thickening. The degree of thickening is judged to be "thickening" when the viscosity in the heating test is 8 mPa·s or higher and "no thickening" when the viscosity is less than 8 mPa·s.

Accordingly, one exhibited an occurrence of a visible gelation/aggregation is judged to be "heat stability: poor (x)", one exhibited no occurrence of a visible gelation/aggregation but exhibited thickening to be "heat stability: good (○)", and one exhibited no occurrence of a visible gelation/aggregation and exhibited no thickening to be "heat stability: very good (⊚)".

This heat stability test is an autoclave treatment conducted usually for sterilization. Such an autoclave treatment assumes a heat sterilization of a product by a retort sterilization which is a sterilization method under a severe heating condition.

Thus, the present disclosure provides a method for manufacturing a denatured whey protein comprising processing a whey protein solution by repeating the following steps (1) and (2) 2 times or more continuously:

(1) a step for treating the whey protein solution on pressure at 50 MPa or higher and on heating at 85 to 100° C.; and, (2) a step for decompressing to 0.05 to 0.5 MPa after the treating of the aforementioned step (1) and maintaining the temperature within the range of the heating temperature of the aforementioned step (1) ±10° C.

Advantageous Effects of Invention

According to the present disclosure, it becomes possible to obtain a thermally denatured whey protein having no adverse effect on the characteristics of a product.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

The manufacturing method of the present disclosure is a method for manufacturing a denatured whey protein by processing a whey protein solution by continuously repeating a step for treating on pressure and on heating and a step, after this pressurization and heating, for conducting a treatment by reducing the pressure to obtain an atmospheric pressure state. It is also possible to continuously repeat the aforementioned 2 steps until the whey protein solution reaches a predetermined temperature.

Also the manufacturing method of the present disclosure is characterized by (1) a step for treating on pressure at certain pressure and on heating at certain temperature instantaneously, and (2) a step, after this treating, for conducting a treatment while releasing the pressure which are repeated 2 times or more continuously. By means of the manufacturing method of the present disclosure, a denatured whey protein having an excellent heat stability is obtained.

Also since the denatured whey protein obtained by the manufacturing method of the present disclosure makes the characteristics of a product satisfactory when compared with use of a whey protein in the product, the manufacturing method of the present disclosure can be conducted also as a method for modifying a whey protein or a method for manufacturing a modified whey protein.

"A whey protein" employed as a raw material in the present disclosure is not limited particularly and may be any protein derived from milk.

For example, it is a whey obtained from a raw material containing the whey such as a milk, skimmed milk, whole milk powder, skimmed milk powder, and the like by a purification using an ordinary method.

The method for the purification into the whey includes, but not limited to, a method for removing casein and milk fat by admixing the milk or skimmed milk with rennet and the like; this process further combined with a treatment by a gel filtration, ultrafiltration, ion exchange, and the like. By such a whey purification method, the resultant WPC (whey protein concentrate), WPI (whey protein isolate) etc., can be employed.

It is also possible to use various whey proteins such as commercially available WPC and WPI. Otherwise, an ordinary dairy product containing a whey protein such as a milk, skimmed milk, skimmed milk powder, and the like may be used as it is.

Generally, "WPC" is prepared to have a protein content of 25 to 80% by mass (Ed. by Yamauchi, Yokoyama, "Milk Sogo Jiten", First edition, Sixth print, Asakura Publishing Co., Ltd., 2004, pages 356 to 357), and in the present disclosure, one having a protein content exceeding 80% is referred to as "WPI", and one having a protein content less than 25% by mass is referred to as "unpurified whey".

As a raw material whey protein in the whey protein solution of the present disclosure, one or 2 or more selected from the unpurified whey, WPC, and WPI can be employed. The form of the raw material whey protein is not limited particularly, and may be either liquid or powder.

The concentration of the whey protein in the aforementioned whey protein solution calculated as protein is preferably 6% by mass or more, more preferably 10 to 18% by mass, and further preferably 10 to 16% by mass. By conducting the treatment of the present disclosure within this range of the concentration, an efficient modification becomes possible while preventing gelation or aggregation of the whey protein.

While the solvent for adjusting the concentration of the whey protein solution is not limited particularly, it is preferable to use water, fresh milk, skimmed milk, and the like.

It is also preferred that the pH of the aforementioned whey protein solution is around the neutral pH, and a neutral pH or weakly acidic pH may also be employed. Typically, the relevant pH is preferably 5.5 to 7.5, more preferably 5.5 to 7.0, further preferably 5.8 to 7.0, more further preferably 6.0 to 7.0, especially preferably 6.0 to 6.7, and further especially preferably 6.0 to 6.5.

When the relevant pH is lower than 5.5, especially 5.0 or lower, the whey protein may undergo gelation or aggregation, because of which the pH is preferably 5.5 or higher. Also when the relevant pH is more alkaline than 7.0, especially when it is 7.5 or higher, the whey protein may undergo thickening, because of which the pH is preferably 7.0 or lower.

While the aforementioned whey protein solution is treated by repeating the following steps (1) and (2) 2 times or more continuously thereby achieving a denatured whey protein having an excellent heat stability, the solution during the period from the time of existing as a starting raw material whey protein-containing solution through the time of becoming an intended denatured whey protein-containing solution is hereinafter referred to as "raw material solution".

The aforementioned step (1) is a step for subjecting the raw material solution to treat on pressure at certain pressure and on heating at certain temperature.

The pressurizing condition upon treating on pressure and heating of the aforementioned raw material solution involves a pressure of 50 MPa or higher, preferably 59 MPa or higher, and more preferably 75 MPa or higher. In this case, the pressurizing condition involving a higher pressure is more preferable, and a pressure within the range of the upper limit of the device employed is preferably employed.

While it is possible to use the pressure at a single stage or two stage, the two stage, when employed, should satisfy "the first stage pressure level>the second stage pressure level" and is the total of the first and second pressure levels.

Since a denatured whey protein obtained at a pressure lower than 50 MPa lacks the heat stability, it is important to employ a pressure of 50 MPa or higher in the aforementioned pressurizing condition for the purpose of obtaining an intended denatured whey protein in the manufacturing method of the present disclosure.

The upper limit of the pressure of a commercially available pressurizing type homogenizer is generally known to be about 200 MPa. Nevertheless, since Table 1 shown later in this specification revealed that a higher pressure allows for a better heat stability, any possible functional advancement of the instrument in future enabling a pressurizing at 200 MPa or higher may still allow for the manufacture of the intended denatured whey protein of the present disclosure.

The heating temperature condition upon treating on pressure and on heating of the aforementioned whey protein, for the purpose of retaining the quality, such as the heat stability, of the denatured whey protein obtained by the manufacturing method of the present disclosure, preferably allows the heating treated at a temperature preferably of 85 to 120° C., more preferably of 85 to 100° C., and especially preferably 90 to 95° C.

Since a denatured whey protein obtained by treating at 80° C. and 130° C. upon the pressure and heating lacks the heat stability, it is important to employ a temperature of 85 to 120° C., in the aforementioned heating temperature condition for the purpose of obtaining an intended denatured whey protein in the manufacturing method of the present disclosure.

The treatment time period upon treating on pressure and on heating of the aforementioned raw material solution is preferably 3 seconds or less, in which range an excellent denatured whey protein is obtained preferably. This treatment time period is a treatment time period employed in the homogenizing part, and the treatment is conducted for about 1 second in the homogenizing part in the "Examples" described later in this specification.

The aforementioned step (2) is a step for conducting a treatment, while releasing the pressure, of the raw material solution which has once been subjected to the treating on pressure and on heating in the aforementioned step (1).

The aforementioned "releasing the pressure" means a reduction in the pressure of a solution which is a change in the pressure resulting from a transport of such a solution, which was once in a pressurized state, into a space where the pressure is lower than the pressure in the pressurized state. By releasing the pressure, the homogenization of the particles in the raw material solution can be conducted more satisfactorily.

The state of the pressure of the aforementioned raw material solution is preferable when the release results in a pressure around the atmospheric pressure. The state of the pressure of the aforementioned raw material solution is at about 0.05 to 0.5 MPa, and by achieving the pressure state within this range the range of the maintaining temperature in step (2) described below becomes possible. Furthermore, the state of the pressure of the aforementioned raw material solution is more preferably at 0.1 to 0.5 MPa and especially preferably at 0.3 to 0.5 MPa.

The maintaining temperature in the aforementioned step (2) after the treating on pressure and on heating in the aforementioned step (1) is preferably within the range of the heating temperature of the aforementioned step (1) ±10° C. and more preferably ±5° C. The maintaining temperature in the aforementioned step (2) after the treating in the aforementioned step (1) is preferably within the range similar to that of the temperature of the heating treatment of the aforementioned step (1). It is preferably 85 to 120° C. and more preferably 85 to 100° C.

Also when the temperature of the heating treatment of the aforementioned step (1) is 85 to 100° C., the maintaining temperature in the aforementioned step (2) is preferably 85 to 100° C.

The treatment time period after releasing the aforementioned pressure is preferably 1.34 minutes or less and more preferably 0.67 minutes or less.

"The treatment time period after releasing the aforementioned pressure" means a time period over which the raw material solution requires to go out of a homogenizing part, pass through a returning route, the raw material loading part, and then a supply route, and finally enter the homogenizing part.

It can be obtained on the basis of "treatment time period of circulatory run No. 1"="In-system quantity (g)/Flow rate (g/h)"×60 minutes; for example, 1.34 minutes corresponds to the condition of "In-system quantity (g)/Flow rate (g/h) "=0.0223, and can be calculated as 0.0223×60=1.338.

The method of the present disclosure involves a treatment of a raw material solution by repeating the aforementioned step (1) and the aforementioned step (2) 2 times or more continuously.

This number of repeat times is preferably 2.25 times or more, more preferably 3.75 times or more. Since a greater number of repeat times gives a denatured whey protein of the present disclosure having a lower adverse effect on a product, the aforementioned number of repeat times is further preferably 4.5 times or more and more preferably 6 times or more. While this number of repeat times is preferably 7 times or less in view of the benefit of the operation efficiency, a larger number of the times give a denatured whey protein having an excellent heat stability and a lower adverse effect on a product.

This number of repeat times can be obtained by a calculation: "Flow rate (g/h)×treatment time period (minutes)/60/

In-system quantity (g)". The start point of this treatment time period is the time point when the temperature reached 85° C. in the aforementioned step (1). Based on the results of our various experiments, the treatment time period until reaching 85° C. in the aforementioned step (1) is about 3 to 10 minutes, and at least within this treatment time period it may be possible to obtain a denatured whey protein having an excellent heat stability.

On the other hand, the "In-system quantity (g)/Flow rate (g/h)" of the present disclosure is 0.03 or less, preferably 0.0223 or less and more preferably 0.0223 to 0.0022.

After completing the aforementioned predetermined repeating treatment, the completed raw material solution is recovered as a denatured whey protein solution. The denatured whey protein solution thus recovered can appropriately be used in the form of a solution as it is, or in the form of a liquid such as a diluted solution or concentrate, or in the form of a powder such as a dried matter. As a result, an excellent denatured whey protein can be obtained.

The denatured whey protein of the present disclosure is excellent in terms of the heat stability, texture, and the like when compared with a denatured whey protein obtained by a manufacturing method of a prior art.

The average particle size of the denatured whey protein in the solution of the denatured whey protein of the present disclosure is preferably within the range of 0.3 to 13.8 μm, more preferably within the range of 0.3 to 1.84 μm and further preferably within the range of 0.38 to 0.7 μm. The thermally denatured whey protein of the present disclosure has a satisfactory heat stability, a satisfactory fattiness, and a smooth texture when compared with a thermally denatured protein of a prior art. The measurement of the average particle size is conducted 3 to 48 hours after manufacturing.

<Method for Measuring Average Particle Size>

The method for measuring the average particle size involves subjecting the resultant denatured whey protein sample solution to a measurement of the value of the average particle size (the particle size corresponding to 50% of the cumulative distribution of the particle size) using a laser diffraction particle size analyzer (Horiba Ltd., trade name: LA-500) under the condition of circulatory flow rate 2 and agitating speed 2.

While the insolubility of the protein in the solution of the denatured whey protein of the present disclosure is not limited particularly, it is preferably 30 to 60%, more preferably 35 to 55%, and further preferably 40 to 50%.

<Method for Measuring Protein Insolubility>

A denatured whey protein solution whose protein concentration is 10% by mass is centrifuged for 10 minutes at 10,000 g, and the percentage of the precipitated protein based on the total protein mass of the denatured whey protein solution is calculated, thereby determining the protein insolubility.

"Protein insolubility (%)"="Precipitated protein quantity"/"Total protein quantity"×100

As discussed above, the denatured whey protein obtained by the method of the present disclosure is a material which exhibits a reduced effect of the heating sterilization (heating) such as whey protein aggregation, gelation, precipitation, and the like even when being incorporated into beverages or food products and which can provide a product having satisfactory texture and flavor. Since the denatured whey protein of the present disclosure has an excellent heat stability, it also imparts a product with a satisfactory flavor and the like.

Also since the denatured protein of the present disclosure is distributed thoroughly without precipitation, it enables smooth swallowing without sandy feel.

Moreover, the denatured whey protein of the present disclosure can be used preferably in groups of foods such as jelly, pudding, ice cream, liquid yogurt, juice, dairy beverage, processed milk, coffee, sports drink, soup, baked food, milk powder, infant milk formulation. Since the denatured whey protein of the present disclosure allows for satisfactorily smooth swallowing, it is suitable to be used in a beverage such as a liquid yogurt.

Otherwise, it can be used preferably as a fat-substituting raw material for a low fat food product, or even in a cosmetic product such as shampoo, rinse, cream, and the like.

Also in the manufacturing method of the present disclosure, it is possible to obtain a satisfactory denatured whey protein without using any additive such as an enzyme or organic solvent. As a result, the manufacturing process does not need to have a step to remove such an additive, thereby contributing to an improved operation efficiency or a reduced production cost. It is also possible to provide a safe food material.

Moreover, a denatured whey protein obtained by the manufacturing method of the present disclosure exhibit satisfactory heat stability, texture, emulsion state, and the like of a product without using additives such as an emulsifier. As a result, together with no need to use any additive such as an enzyme or organic solvent in the manufacturing method of the present disclosure, the whey protein of the present disclosure can provide an additive-free or low additive food product, i.e., a safer food product.

Figure 1:
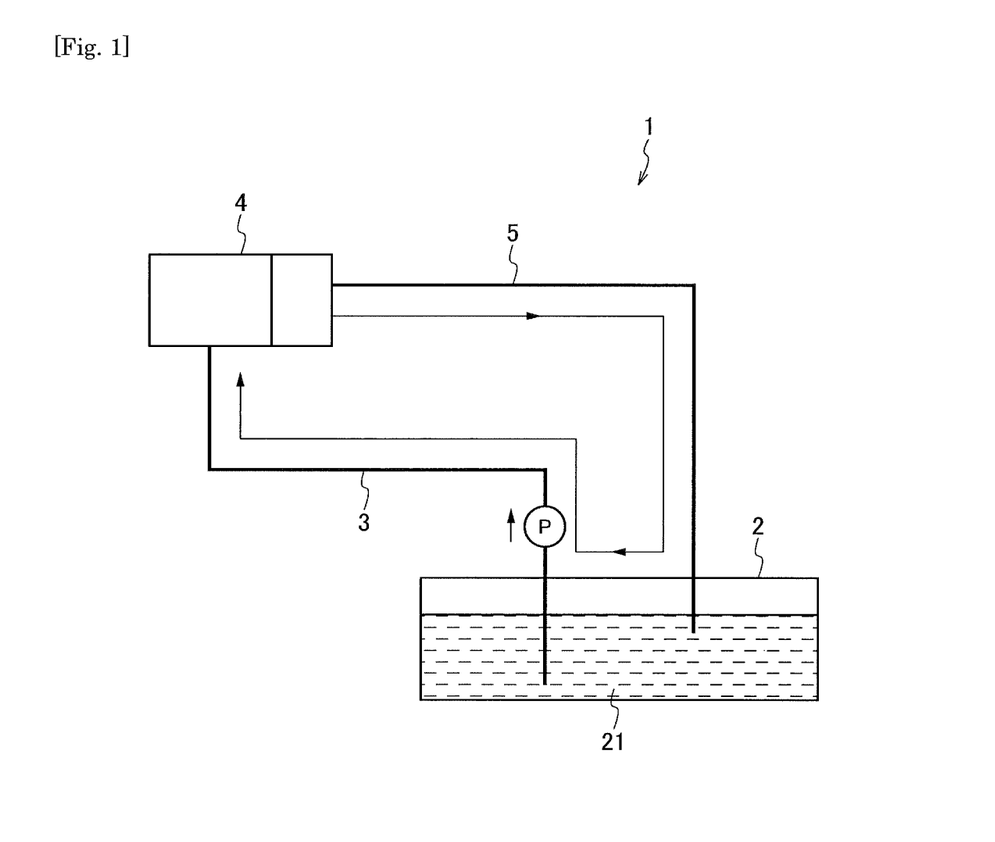
FIG. 1 is a schematic view indicating a pressurizing-type homogenizer which is one example of the devices employed in the manufacturing method of the present disclosure.
Figure 2:
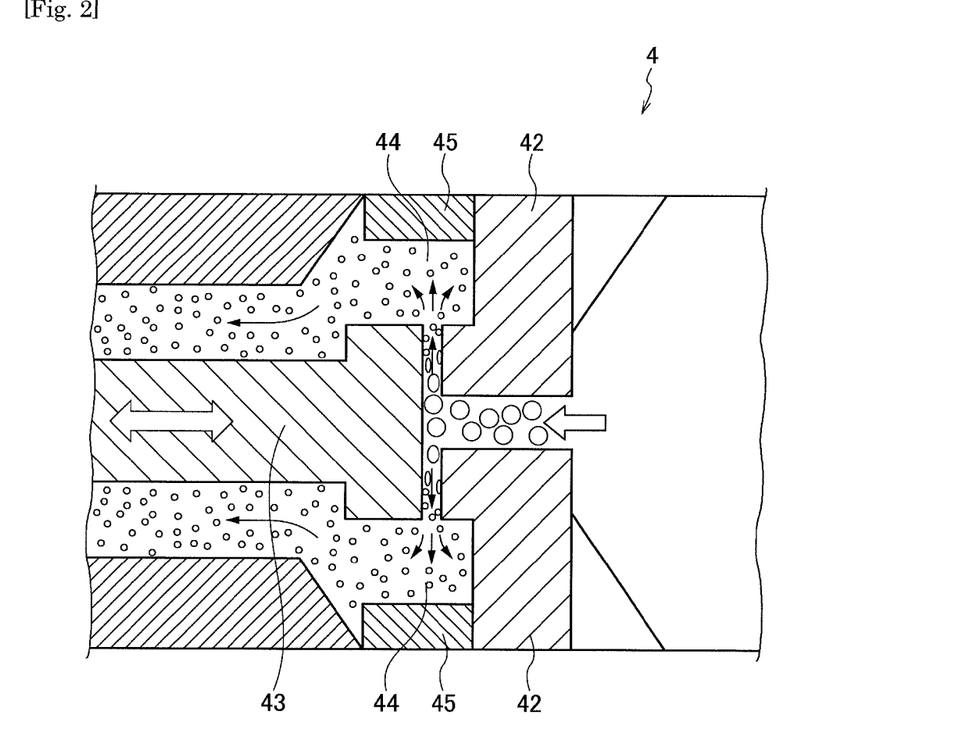
FIG. 2 is a schematic view indicating a pressurizing mechanism and a homogeneous valve mechanism of the homogenizing part of the pressurizing-type homogenizer employed in the manufacturing method of the present disclosure.

While an example of the manufacturing method of the present disclosure is described with referring to FIG. 1 and FIG. 2, the method of the present disclosure is not limited to the following description, and can arbitrarily be practiced within the scope of the present disclosure.

With referring to FIG. 1, the outline of the method of the present disclosure is described.

The raw materials such as a whey protein, water, and the like are loaded into a raw material loading part 2, and stirred to obtain a raw material solution 21. This raw material solution is transported by a pump ("P" in the figure) provided in the raw material loading part 2 via a supply route 3 to a homogenizing part 4.

The transported raw material solution is subjected to the treating on pressure and on heating in the homogenizing part 4, and thereafter released into an atmospheric pressure with the heating temperature is being held, thereby accomplishing the homogenization of the raw material solution, thereby reducing the size of the particles present in the raw material solution.

Then, the homogenized raw material solution is returned from the homogenizing part 4 via a returning route 5 to the raw material loading part 2. Thereafter, the returned raw material solution is supplied by the pump to the homogenizing part 4, and then in this homogenizing part 4 it is subjected to the homogenization again and then returned to the raw material loading part 2. This continuous circulation is conducted to a certain extent, and thereafter the raw material solution is recovered from the raw material loading part 2, and the solution thus recovered is referred to a solution of the denatured whey protein of the present disclosure.

With referring to FIG. 2, the homogenization of the raw material solution is further detailed.

FIG. 2 is a schematic view indicating a pressurizing-type homogenizer in the homogenizing part 4. This homogenizing part 4 is constituted from a pressurizing mechanism of a piston-fitted plunger-type high pressure pump (not shown) followed by a downstream homogeneous valve mechanism of a homogeneous valve capable of adjusting the gap.

The raw material solution is subjected to the heat treatment while being forced by a plural of plunger pumps to enter the channel of a homo-valve sheet 42 under a high pressure at a low speed, and it is compressed and undergoes a collision with a homo-valve 43. Although this homo-valve 43 in FIG. 2 moves to the homo-valve sheet side, it may move to the side opposite to the homo-valve sheet 42 as appropriate.

The raw material solution once undergoing the collision further run into a narrow channel between the homo-valve 43 and the homo-valve sheet 42, and upon running out of this channel, a rapid increase in the speed or a rapid relative reduction in the pressure occurs, resulting in an exit from this channel while maintaining the temperature of the raw material solution. At the same time, a vigorous turbulence occurs and allowing the particles to be homogenized upon exit from a gap 44. Thereafter a collision with a breaker ring 45 occurs and the homogenized raw material solution exit into the returning route.

The present technology can employ the following constitutions.

[1] A method for manufacturing a denatured whey protein or a method for modifying a whey protein comprising processing a whey protein solution by repeating the following steps (1) and (2) 2 times or more continuously:

(1) a step for treating the whey protein solution on pressure at 50 MPa or higher and on heating at 85 to 120° C.; and, (2) a step for decompressing to 0.05 to 0.5 MPa after the treating of the aforementioned step (1) and maintaining the whey protein solution in the range of the heating temperature of the aforementioned step (1) ±10° C.

[2] A method for manufacturing a denatured whey protein or a method for modifying a whey protein comprising processing a whey protein solution by repeating the following steps (1) and (2) 2 times or more continuously:

(1) a step for treating the whey protein solution on pressure at 50 MPa or higher and on heating at 85 to 100° C.; and, (2) a step for decompressing to 0.05 to 0.5 MPa after the treating of the aforementioned step (1) and maintaining the whey protein solution in the range of the heating temperature of the aforementioned step (1) ±10° C.

[3] The method for manufacturing a denatured whey protein or the method for modifying a whey protein according to the aforementioned [1] or [2] wherein the aforementioned whey protein solution has a pH from 5.5 to 7.5.

[4] The method for manufacturing a denatured whey protein or the method for modifying a whey protein according to any one of the aforementioned [1] to [3] wherein the treating of the aforementioned step (1) is performed for 3 seconds or less.

[5] The method for manufacturing a denatured whey protein or the method for modifying a whey protein according to any one of the aforementioned [1] to [4] wherein the treating on pressure of the aforementioned step (1) is performed at 75 MPa or higher. A pressure of 75 MPa or higher and 200 MPa or lower may be used.

[6] The method for manufacturing a denatured whey protein or the method for modifying a whey protein according to any one of the aforementioned [1] to [5] wherein the treating on heating of the aforementioned step (1) is performed at 90 to 95° C.

[7] The method for manufacturing a denatured whey protein or the method for modifying a whey protein according to any one of the aforementioned [1] to [6] wherein the maintaining temperature of the aforementioned step (2) is the temperature in the range of the heating temperature of the aforementioned step (1) ±5° C.

[8] The method for manufacturing a denatured whey protein or the method for modifying a whey protein according to the any one of aforementioned [1] to [7] wherein the maintaining temperature of the aforementioned step (2) is 85 to 100° C.

[9] The method for manufacturing a denatured whey protein or the method for modifying a whey protein according to any one of the aforementioned [1] to [8] wherein the treatment time period after the decompression of the aforementioned step (2) is 1.34 minutes or less and more preferably 0.67 minutes or less.

[10] The method for manufacturing a denatured whey protein or the method for modifying a whey protein according to any one of the aforementioned [1] to [9] wherein the aforementioned steps (1) and (2) are repeated 2 times or more and 5 times or less continuously.

[11] The method for manufacturing a denatured whey protein or the method for modifying a whey protein according to any one of the aforementioned [1] to [10] wherein the concentration of the whey protein in the aforementioned whey protein solution calculated as protein is 6% by mass or more and preferably 10 to 16% by mass.

The pH of the whey protein solution according to any one of the aforementioned [1] to [11] is preferably within a range around the neutral pH (neutral to weakly acidic range), more preferably 5.5 to 7.0, further preferably 6.0 to 7.0, and especially preferably 6.0 to 6.5.

[12] A denatured whey protein obtained by the manufacturing method or the modifying method of the aforementioned [1] to [11].

EXAMPLES

The followings are the description of typical Examples and the like, to which the present invention (present disclosure) is not limited.

Example 1

In a 3000-g vat, an undenatured whey protein concentrate (WPC, Milei 80: manufactured by Milei GmbH) was dissolved at 12.5% by mass (protein concentration: 10%) in water at 25° C. to prepare 2000 g in total of an undenatured WPC solution (hereinafter referred to as WPC raw material solution). This raw material solution had a pH of 6.3.

The entire amount of this WPC-containing raw material solution was loaded to the hopper of the raw material loading part of a pressurizing-type homogenizer (manufactured by APV Lanier Co., treatment capacity: 180 kg/h).

The WPC-containing raw material solution was pressurized continuously at a flow rate of 180000 g/h by the high pressure pump of a pressurizing-type homogenizer to circulate through the raw material loading part, supply route, homogenizing part (treatment pressure; first stage: 70 MPa, second stage: 5 MPa), returning route, and then raw material loading part in this order.

The WPC-containing raw material solution which was raised to 85° C. by the heating mechanism of the homogenizing part was treated by a two-stage pressurizing step (treatment pressure; first stage: 70 MPa, second stage: 5 MPa), and thereafter the raw material solution was released from the pressurized state to a reduced pressure of an atmospheric state (about 0.1 MPa).

The raw material solution (80 to 90° C.) which had been released from the pressurized state exited from the homogenizing part, passed through the returning route, and then returned to the hopper of the raw material loading part. Again the WPC-containing raw material solution (80 to 90° C.) was pressurized by the high pressure pump while being transported to the homogenizing part. This operation conducted for 3 minutes had a number of the circulatory run times of 4.5.

The treatment time period after the raw material solution was released after the treating on pressure and on heating into an atmospheric state was 0.67 (=2,000/180,000×60) minutes.

As a result, Example Product 1 was obtained.

Comparative Example 1

Based on Example 1 described in the Japanese Patent No. 4637449 (current Folgers) (Patent Document 1/family; U.S. Pat. No. 6,605,311 B2), a protein heat denaturation condition was employed to conduct a circulation of a high pressure shear mixing treatment followed by a high pressure (49 MPa) homogenizer to obtain a denatured whey protein (Comparative Product 1). The procedure is detailed below.

3 Liters of a mixture of 20% by mass of a protein containing a partially denatured whey protein concentrate (WPC, SIMPLESSE: Manufactured by CP Kelco) and 80% by mass of water at 20° C. (pH 6.5) was prepared in a 4000-mL beaker.

This mixture was subjected to a constant high shear mixing using a TK homomixer Mark II high shear mixing machine manufactured by PRIMIX Corporation operated at 12,000 rpm while heating to 75° C. Under a continuous application of the high shear mixing, the mixture was kept at 76.7° C. for 30 minutes and then cooled to a temperature at least of 32.22° C. As a result a heat and shear-processed denatured whey protein solution was obtained.

Subsequently, the partially undenatured whey protein solution was subjected to the homogenization of the mixture using APV Gaulin homogenizer (Gaulin Homogenizer) operated at a pressure of about 7000 psi (about 49 MPa) as a single stage, while repeating the homogenization step three times to obtain Comparative Product 1.

Example Product 1 and Comparative Product 1 were compared.

They were treated by an autoclave for 15 minutes at 120° C. and the heat stability of the both after autoclaving was investigated.

Figure 3:
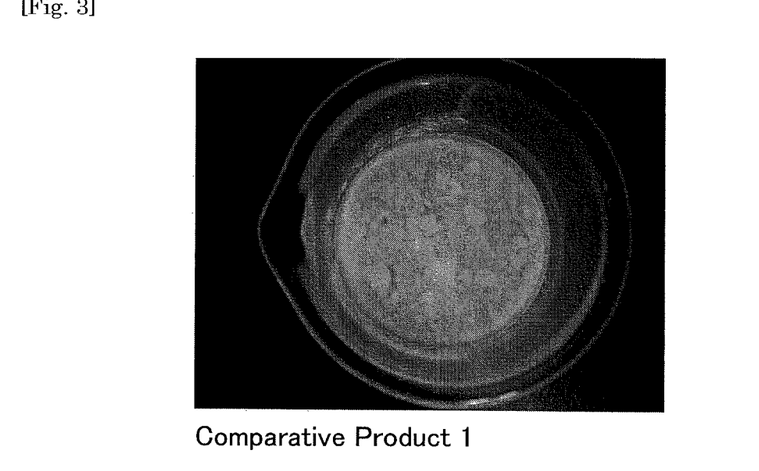
FIG. 3 is a figure-substituting photograph showing the appearance of Comparative product 1 after heat treatment.
Figure 4:
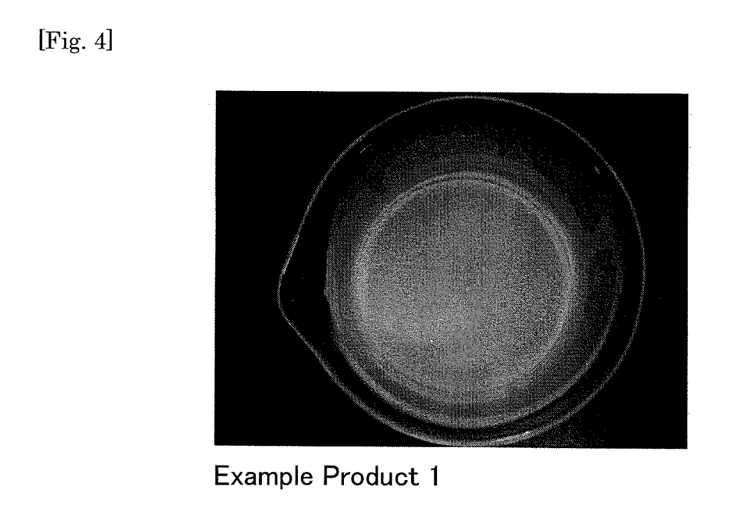
FIG. 4 is a figure-substituting photograph showing the appearance of Example product 1 after heat treatment.

As shown in FIG. 3 and FIG. 4, the heat stability test revealed that Comparative Product 1 (FIG. 3) showed a visually identifiable gelation while Example Product 1 (FIG. 4) remained in the form of a liquid without gelation.

Moreover, Comparative Product 1 had an average particle size shortly after preparation of 1.6 μm and the measurement after the heat stability test was impossible due to the gelation, while Example Product 1 had an average particle size shortly after preparation of 0.38 to 0.7 μm and after the heat stability test of 0.5 to 3.5 μm.

The average particle size was measured according to the aforementioned <Method for measuring average particle size>. The phrase "shortly after preparation" means that the average particle size was measured 3 to 48 hours after the manufacture.

The protein insolubility of Example Product 1 was measured according to the aforementioned <Method for measuring protein insolubility> and was 43 to 47%.

Based on those described above, Example Product 1 was proven to have a far more excellent heat stability when compared with Comparative Product 1.

In Examples 2 and 3 in Patent Document 1, the denatured whey protein was obtained by a high speed shear mixing treatment under a protein denaturing condition followed by a high pressure (49 MPa) homogenizer treatment. Since such a process is based on the understanding that a denatured whey protein is obtained by the high pressure shear mixing treatment and thereafter subjected to a homogenization treatment, it is different entirely from our technology in the procedure of the steps and in the target of the treatment. In addition, the denatured whey protein of Examples 2 and 3 in Patent Document 1 is different also in the substance entity itself from the denatured whey protein of the present technology. This is evident from the results of the comparison between our Example Product 1 and Comparative Product 1 as described above.

Moreover, the pressurizing condition of the homogenizer in Patent Document 1 employs 42 MPa/49 MPa. Since such a process is based on the understanding that the homogenization treatment is conducted under a low pressurizing condition intending to grind a denatured material, it is different entirely from our technology based on the understanding that the homogenization treatment is conducted under a high pressurizing condition. Furthermore, as shown in Table 1 in our Experiment Example 1, the object of our technology cannot be accomplished under the pressurizing condition lower than 50 MPa The homogenizer treatment of Example 1 in Patent Document 1 treats about 60 kg with a treatment capacity of 200 L/h and accordingly the apparent circulation time period becomes 18 minutes ((60/200)×60=18 minutes) which means that the circulation time period in Patent Document 1 tends to be prolonged, thereby being different entirely from our understanding that the circulation time period should be reduced. In addition, as shown in Table 4 in our Experiment Example 4, the object of our technology cannot be accomplished with 18 minutes which is the circulation time period in Patent Document 1.

Accordingly, the denatured whey protein described in Patent Document 1 is in a viscous state as shown in the aforementioned our Comparative Product 1, and cannot accomplish the object of our technology. On the other hand, the denatured whey protein obtained by the manufacturing method of our technology has an excellent heat stability which avoids any adverse effects on the characteristics of a product.

<Heat Stability Test>

A sample is prepared as a 10% by mass solution of the protein, and this solution was heated by an autoclave at 120° C. for 15 minutes, after which it was judged as "heat stability: poor (x)" when it exhibited any occurrence of a visible gelation/aggregation and it was judged "heat stability: very good (⊚), good (○)" when it exhibited no such an occurrence according to the following criteria for thickening:

Heat Stability Evaluation
⊚: Liquid (no thickening)
○: Liquid (thickening), Viscosity of 8 mPa·s or higher in heating test
x: Gelation Experiment Example 1

Pressurizing Condition

A denatured whey protein was observed similarly to Example 1 except for the change in the pressurizing condition (treatment pressure; First stage: 20, 37, 54, 70, and 95 MPa) as shown in Table 1.

In a 3000-g vat, an undenatured whey protein concentrate (WPC, Milei 80: manufactured by Milei GmbH) was dissolved at 12.5% by mass (protein concentration: 10%) in water at 25° C. to prepare 2000 g in total of an undenatured WPC solution (hereinafter referred to as WPC raw material solution). This raw material solution had a pH of 6.3.

The entire amount of this WPC-containing raw material solution was loaded to the hopper of the raw material loading part of a pressurizing-type homogenizer (manufactured by APV Lanier Co., treatment capacity: 180 kg/h).

Subsequently, the WPC-containing raw material solution was pressurized continuously at a flow rate of 180000 g/h by the high pressure pump of a pressurizing-type homogenizer while being transported to the homogenizing part via the supply route.

The WPC-containing raw material solution thus transported was heated to 85° C. in the homogenizing part, and the heated WPC-containing raw material solution was treated by a 2-stage step (treatment pressure; First stage: 20, 37, 54, 70, and 95 MPa, Second stage: 5 MPa), and then the raw material solution was decompressed to the atmospheric pressure (about 0.1 MPa) and thereafter exit from the homogenizing part, passed through the returning route, and returned to the hopper of the raw material loading part. Again, the WPC-containing raw material solution was pressurized by a high pressure pump while being transported to the homogenizing part.

This operation conducted for 3 minutes had a number of the circulatory run times of 4.5. After the raw material solution was released to the atmospheric pressure condition after the treating on pressure and on heating, the treatment time period was 0.67 minutes.

As shown in Table 1, upon treatment at 25, 42, 59, 75, and 100 (First stage+Second stage) MPa, the pressurization at 42 MPa or less resulted in a denatured whey protein whose heat stability was not preferable. Based on this, it is important to conduct the treating on pressure and on heating at 50 MPa or higher.

The effect of the heat stability under the pressurizing condition (50 MPa or higher) in this test was an extremely good effect which was observed as a liquid state without undergoing thickening even under the condition of the pH of the raw material solution of 6.0, 6.1, and 6.4. Even under the condition of the pH of the raw material solution of 5.5, 5.7, 5.8, 6.5, and 6.6, the effect of a heat stability judged as good or better was observed.

TABLE 1

| Whey protein concentration (% by mass) | Loaded quantity (g) | Pressure (1st stage + 2nd stage; MPa) | Temperature-Time period | Heat stability test |
|---|---|---|---|---|
| 10% | 2000 | 25 | 85° C.-180 s | X |
| 10% | 2000 | 42 | 85° C.-180 s | X |
| 10% | 2000 | 59 | 85° C.-180 s | ○ |
| 10% | 2000 | 75 | 85° C.-180 s | ⊚ |
| 10% | 2000 | 100 | 85° C.-180 s | ⊚ |

Experiment Example 2

Heating Temperature Condition

A denatured whey protein was obtained while changing the heating temperature and the treatment time period condition in Example 1 as shown in Table 2.

In a 1000-g vat, an undenatured whey protein concentrate (WPC, Milei 80: manufactured by Milei GmbH) was dissolved at 12.5% by mass (protein concentration: 10%) in water at 25° C. to prepare 400 g in total of an undenatured WPC solution (hereinafter referred to as WPC raw material solution). This raw material solution had a pH of 6.3.

The entire amount of this WPC-containing WPC raw material solution was loaded to the hopper of the raw material loading part of a pressurizing-type homogenizer (manufactured by APV Lanier Co., treatment capacity: 180 kg/h).

Subsequently, the WPC-containing raw material solution was pressurized continuously at a flow rate of 180000 g/h by the high pressure pump of a pressurizing-type homogenizer while being transported to the homogenizing part via the supply route.

The transported WPC raw material solution was heated in the homogenizing part to (1) 130° C., (2) 120° C., (3) 100° C., (4) 95° C., and (5) to (7) 85° C., and the heated WPC raw material solution was treated by the 2-stage step (treatment pressure; First stage: 70 MPa, Second stage: 5 MPa), and then the raw material solution was released to the atmospheric pressure (about 0.1 MPa), and thereafter exited from the homogenizing part, passed through the returning route and returned to the hopper of the raw material loading part. Again, the WPC raw material solution was pressurized by a high pressure pump while being transported to the homogenizing part.

This operation was conducted for a time period of (1) 60 seconds, (2) 60 seconds, (3) 60 seconds, (4) 60 seconds, (5) 60 seconds, (6) 30 seconds, and (7) 0 second. The maintaining temperature during the circulation was (1) 130° C., (2) 120° C., (3) 100° C., (4) 95° C., and (5) to (7) 85° C.

As shown in Table 2, a heating temperature of 80° C. or lower resulted in a denatured whey protein whose heat stability was not preferable. Based on this, it is important to conduct the treating on pressure and on heating at 85° C. or higher.

Also in the heating temperature test in Table 2, the denatured whey protein obtained by the treatment at about 95° C. has an excellent heat stability and retained its quality satisfactorily.

The effect of the heat stability under the heating condition (85 to 120° C.) in this test was an extremely good effect which was observed as a liquid state without undergoing thickening even under the condition of the pH of the raw material solution of 5.9, 6.0, and 6.2. Even under the condition of the pH of the raw material solution of 5.6, 5.8, 6.4, 6.5, and 6.7, the effect of a heat stability judged as good or better was observed.

TABLE 2

| Whey protein concentration (% by mass) | Loaded quantity (g) | Pressure (MPa) | Temperature-Time period | Heat stability test |
|---|---|---|---|---|
| 10% | 400 | 75 | 130° C.-60 s | X |
| 10% | 400 | 75 | 120° C.-60 s | ○ |
| 10% | 400 | 75 | 100° C.-60 s | ⊚ |
| 10% | 400 | 75 | 95° C.-60 s | ⊚ |
| 10% | 400 | 75 | 85° C.-60 s | ⊚ |
| 10% | 400 | 75 | 85° C.-30 s | ○ |
| 10% | 400 | 75 | 85° C.-0 s | X |

Experiment Example 3

Condition of Number of Circulatory Run Times

A denatured whey protein was obtained by changing the number of the circulatory run times in Example 1 as shown in Table 3.

In a 3000-g vat, an undenatured whey protein concentrate (WPC, Milei 80: manufactured by Milei GmbH) was dissolved at 12.5% by mass (protein concentration: 10%) in water at 25° C. to prepare 2000 g in total of an undenatured WPC solution (hereinafter referred to as WPC raw material solution). This raw material solution had a pH of 6.3.

The entire amount of this WPC raw material solution was loaded to the hopper of the raw material loading part of a pressurizing-type homogenizer (manufactured by APV Lanier Co., treatment capacity: 180 kg/h).

Subsequently, the WPC raw material solution was pressurized continuously at a flow rate of 180000 kg/h by the high pressure pump of a pressurizing-type homogenizers while being transported to the homogenizing part via the supply route.

The transported WPC raw material solution was heated to 85° C. in the homogenizing part, the heated WPC raw material solution was treated by the 2-stage step (treatment pressure; First stage: 70 MPa, Second stage: 5 MPa), and then the raw material solution was released to the atmospheric pressure (about 0.1 MPa), and thereafter exited from the homogenizing part, passed through the returning route, and returned to the hopper of the raw material loading part. Again, the WPC raw material solution was pressurized by a high pressure pump while being transported to the homogenizing part.

This operation was conducted for a time period of (1) 30 seconds (number of the circulatory run times: 0.75), (2) 60 seconds (number of the circulatory run times: 1.5), (3) 90 seconds (number of the circulatory run times: 2.25), (4) 120 seconds (number of the circulatory run times: 3), (5) 150 seconds (number of the circulatory run times: 3.75), and (6) 180 seconds (number of the circulatory run times: 4.5).

As shown in Table 3, a number of the circulatory run times of 1.5 or less resulted in a denatured whey protein whose heat stability was not preferable. Based on this, it is important to conduct the treating on pressure and on heating with a number of the circulatory run times of 2 or more.

TABLE 3

| Whey protein concentration (% by mass) | Loaded quantity (g) | Time period at 85° C. or higher (seconds) | Number of the circulatory run times | Heat stability test |
|---|---|---|---|---|
| 10% | 2000 | 30 s | 0.75 | X |
| 10% | 2000 | 60 s | 1.5 | X |
| 10% | 2000 | 90 s | 2.25 | ○ |
| 10% | 2000 | 120 s | 3.00 | ⊙ |
| 10% | 2000 | 150 s | 3.75 | ⊙ |
| 10% | 2000 | 180 s | 4.5 | ⊙ |

Experiment Example 4

Condition of Treatment Time Period After Treating on Pressure and on Heating

A denatured whey protein was obtained by changing the treatment time period (time period required for one circulatory run (minutes)) after the treating on pressure and on heating in Example 1 as shown in Table 4.

An undenatured whey protein concentrate (WPC, Milei 80: manufactured by Milei GmbH) was dissolved at 12.5% by mass (protein concentration: 10%) in water at 25° C. to prepare 400, 500, 2000, 4000, 5500, and 7000 g in total of each undenatured WPC solution (hereinafter referred to as WPC raw material solution). This raw material solution had a pH of 6.3.

The entire amount of each WPC raw material solution was loaded to the hopper of the raw material loading part of a pressurizing-type homogenizer (manufactured by APV Lanier Co., treatment capacity: 180 kg/h).

Subsequently, each WPC raw material solution was pressurized continuously at a flow rate of 180000 kg/h by the high pressure pump of a pressurizing-type homogenizers while being transported to the homogenizing part via the supply route.

The transported each WPC raw material solution was heated to 85° C. in the homogenizing part, and the heated WPC raw material solution was treated by a 2-stage step (treatment pressure; First stage: 70 MPa, Second stage: 5 MPa), and then the WPC raw material solution was released to the atmospheric pressure (about 0.1 MPa), and thereafter exited from the homogenizing part, passed through the returning route, and returned to the hopper of the raw material loading part. Again, each WPC raw material solution was pressurized by a high pressure pump while being transported to the homogenizing part. This operation was conducted for 180 seconds.

The treatment time period of each WPC raw material solution (time period required for one circulatory run (minutes)) after the treating on pressure and on heating was 0.14, 0.17, 0.67, 1.34, 1.84, and 2.34 minutes, respectively.

As shown in Table 4, a treatment time period (minutes) after the treating on pressure and on heating of 1.84 minutes or longer resulted in a denatured whey protein whose heat stability was not preferable. Based on this, it is important that the treatment time period (minutes) after the treating on pressure and on heating is 1.34 minutes or less, and a shorter treatment time period resulted in a more excellent heat stability of the denatured whey protein.

TABLE 4

| Loaded quantity (g) | In-system quantity/ Flow rate | Time period required for one circulatory run (minutes) | Temperature- Time period | Heat stability test |
|---|---|---|---|---|
| 400 | 0.00222 | 0.14 | 85° C.-180 s | ⊚ |
| 500 | 0.00278 | 0.17 | 85° C.-180 s | ⊚ |
| 2000 | 0.01111 | 0.67 | 85° C.-180 s | ⊚ |
| 4000 | 0.02222 | 1.34 | 85° C.-180 s | ○ |
| 5500 | 0.03056 | 1.84 | 85° C.-180 s | X |
| 7000 | 0.03889 | 2.34 | 85° C.-180 s | X |

Experiment Example 5

Condition of Whey Protein Concentration

A denatured whey protein was obtained similarly to Example 1 except for changing the whey protein concentration to "15%". The results of the heat denaturation test were designated as good "○".

Formulation Example 1

Mango Flavored Jelly

According to the formulation indicated in Table 5 shown below as well as the steps 1 to 5, a protein-containing jelly was formulated.

1. A protein raw material is dissolved in water and stirred while adding a corn oil, sugar, gelling agent, emulsifier, and soybean polysaccharide.
2. After warming to 80° C., dissolution is accomplished while stirring for 10 minutes.
3. Citric acid, sucralose, colorant, and flavor are added.
4. The temperature is held at 85° C. for 30 minutes to accomplish sterilization.
5. The mass is corrected and the formulation is packed in a container.

The jelly employing the denatured whey protein (Example Product 1) manufactured in Example 1 had a smooth texture, while the jelly employing the WPC80 whey protein had a sandy texture. Thus, the denatured whey protein of the present disclosure had no adverse effect on the product, and was able to impart the product with a satisfactory flavor entirely.

TABLE 5

| Formulation (kg) | Example Product 1-containing jelly | WPC80-containing jelly |
|---|---|---|
| Granulated sugar | 13.0 | 13.0 |
| Example Product 1 | 9.5 | — |
| WPC80 | — | 9.5 |
| Corn oil | 3.0 | 3.0 |
| Citric Acid (anhydrous) | 0.7 | 0.7 |
| Gelling agent (Locust, guar gum) | 0.8 | 0.8 |
| Soybean polysaccharide | 0.8 | 0.8 |
| Emulsifying agent (glycerin fatty acid ester) | 0.1 | 0.1 |
| Sucralose | 0.005 | 0.005 |
| Colorant (Yellow No. 5) | 0.0036 | 0.0036 |
| Flavor | 0.4 | 0.4 |
| Water as remainder | 100.0 | 100.0 |

REFERENCE SIGNS LIST

1: High pressure-type homogenizer
2: Raw material loading part
21: Raw material solution
3: Supply route
4: Homogenizing part
42: Homo-valve sheet
43: Homo-valve
44: Gap
45: Breaker ring
5: Returning route Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A method for manufacturing a denatured whey protein, said method comprising:
   (a) heating a whey protein solution by circulating the whey protein solution through a heat mechanism of a homogenizing part of a pressurizing-type homogenizer;
   (b) treating the whey protein solution at a pressure of 50 to 100 MPa;
   (c) decompressing the whey protein solution to 0.05 to 0.5 MPa after the treating step (b); and
   (d) obtaining denatured whey protein having an average particle size of 0.38 to 0.7 μm and protein insolubility of 40 to 50%,
   wherein steps (b) and (c) are conducted by circulating the whey protein solution through the heat mechanism of the homogenizing part of the pressurizing-type homogenizer at a maintained temperature of 85 to 100° C., and
   wherein steps (b) and (c) are continuously repeated 2 times or more to 7 times or less.

2. The method for manufacturing a denatured whey protein according to claim 1, wherein the whey protein solution has a pH from 5.5 to 7.5.

3. The method for manufacturing a denatured whey protein according to claim 1, wherein the treating of the whey protein solution of step (b) is performed for 3 seconds or less.

4. The method for manufacturing a denatured whey protein according to claim 1, wherein the treating of the whey protein solution of step (b) is performed at a pressure of 75 to 100 MPa.

5. The method for manufacturing a denatured whey protein according to claim 1, wherein the maintained temperature is 90 to 95° C.

6. The method for manufacturing a denatured whey protein according to claim 1, wherein a treatment time period of maintaining the whey protein solution of step (c) after the decompression is from 0.14 to 0.67 minutes.

7. The method for manufacturing a denatured whey protein according to claim 1, wherein a number of repetitions for steps (b) and (c) from 3 to 5 times continuously.

* * * * *